June 6, 1933.  A. B. MODINE  1,913,339
AUTOMOBILE HEATING AND VENTILATING APPARATUS
Filed March 7, 1929

Witness:
William P. Kilroy

Inventor:
Arthur B. Modine
Hill & Hill
Attys

Patented June 6, 1933

1,913,339

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

AUTOMOBILE HEATING AND VENTILATING APPARATUS

Application filed March 7, 1929. Serial No. 344,966.

My invention relates to heating apparatus for automobiles and more particularly it relates to devices which utilize the heat energy radiated by internal combustion engines for the heating of the interior of the automobile body and which utilizes the travel of the automobile to accelerate the circulation of air and to aid in ventilation.

An object of the invention is the provision of improved means for heating and ventilating the closed body of an automobile by utilizing the heat radiated by the power plant of the automobile.

Another object of the invention is the provision of improved means for trapping a portion of the heat radiated by an engine of the class described.

A further object of the invention is the provision of improved means for conveying radiated heat from the power plant into the interior of an automobile body.

A still further object of the invention is to provide improved means for preheating air and by induced air currents accelerating its circulation through the interior of the automobile body.

Other further and more particular objects will become apparent as the description proceeds.

Referring now to the drawing forming a part of this specification:

Figure 1:
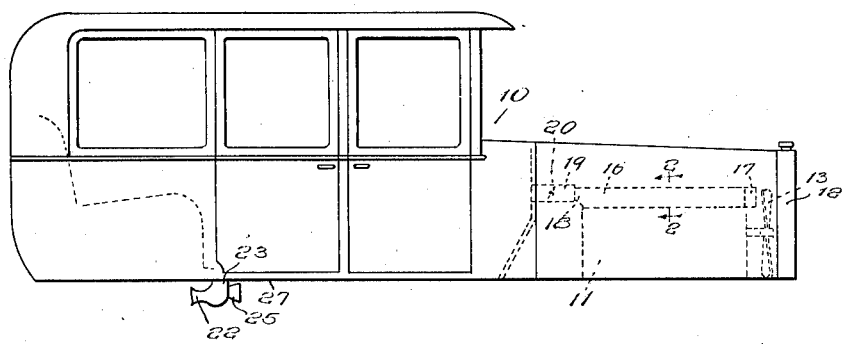
Fig. 1 is an elevational view of an automobile body equipped with the device of my invention.
Figure 2:
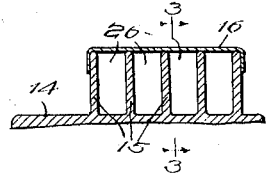
Fig. 2 is a sectional view along the line 2—2 of Fig. 1.
Figure 3:
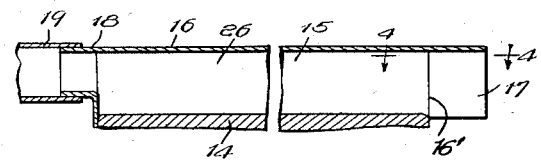
Fig. 3 is a view along the line 3—3 of Fig. 2.
Figure 4:
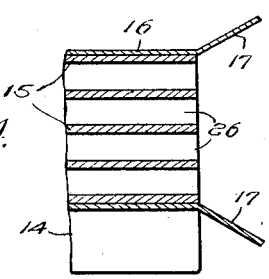
Fig. 4 is a view along the line 4—4 of Fig. 3.
Figure 5:
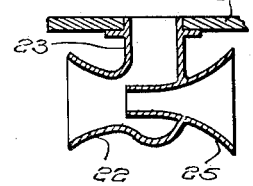
Fig. 5 is a sectional view through means adapted to induce air currents to pass through the power plant of the automobile and to accelerate its circulation through the body of the automobile.

Referring now more particularly to the drawing, the numeral 10 generally designates an automobile in which a preferred embodiment of the device comprising my invention is installed. The automobile 10 has as a part of its power plant an internal combustion engine 11. The engine 11 is cooled through the medium of a radiator 12 with which it is connected by pipes or any other suitable means (not shown). A fan 13 is mounted between the engine 11 and the radiator 12 to assist in the circulation and passage of air through the radiator.

The device includes a combined heating and ventilating system for the automobile 10, the heating apparatus including a plurality of fins 15 shown as integrally formed with a cylinder head 14 forming a portion of the engine 11. The fins 15 may be separately formed if desired and may be brazed or otherwise fastened to the cylinder head. A cover 16 is positioned on the top edges of the fins 15 so as to form together with the fins and cylinder head 14, a plurality of longitudinally extending ducts 26. The front portion of the cover 16 is open as indicated at 16′ and has a pair of outwardly extending plates forming flared wings 17. The wings 17 tend to direct and deflect a portion of the air, drawn through the radiator unit 12 by the action of the fan 13, into and through the ducts 26. The air, in passing through the radiator 12, absorbs heat and is further heated by radiation from the fins 15 and the cylinder head 14. The rear ends of the ducts 26 open into a constricted neck member 18. The construction of the member 18 retards the flow of air through the ducts 26 which subjects the air to the heat of the fins for a longer period of time, causing the temperature of the air to be increased. The neck member 18 discharges into a pipe 19. The rear end of the pipe 19 opens into the automobile body through the front wall partition 21 of the automobile body. The pipe member 19, the neck member 18, and the ducts 26 together provide a conduit system in which air is heated and through which it is discharged into the interior of the automobile body. A damper 20 is rotatably mounted in the pipe 19 and operable to regulate or entirely shut off the flow of air through the conduit.

An inspirator or ejector 22 is mounted underneath the automobile body. A vertical pipe 23 provides means for fastening the ejector 22 to the floor 27 of the automobile. The pipe 23 projects through the floor 27 and connects the ejector 22 with the interior of the automobile body. The ejector 22 is of the Venturi-tube type and has a funnel shaped member 25 mounted thereon with its open end projecting forwardly and its constricted end discharging into the ejector. The member 25 is intended to utilize the motion of the automobile in creating low pressure in the ejector 22, and to thereby produce air currents which accelerate the circulation throughout the body of the automobile. The funnel shaped construction of the member 25 adapts it for effectively gathering air and discharging it through its constricted end portion into the ejector 22 when the automobile is travelling forwardly or the engine is in operation. The ejector-like action of the members 22 and 25 increase the rapidity with which air travels into the automobile body from the radiator 12 and the engine 11.

Figure 6:
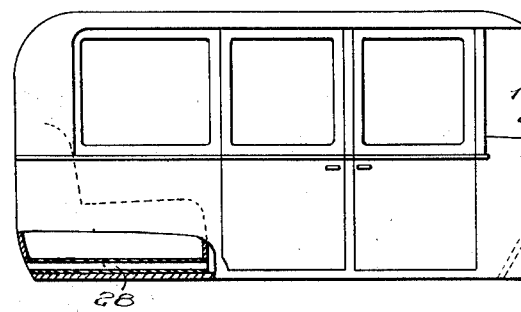
Fig. 6 is an elevational view of an automobile body showing an alternative embodiment of the invention.

In Fig. 6 I have shown alternative means for discharging air after it has been heated and circulated through the automobile body. This means consists of a duct 28 positioned under the rear seat of the car. The duct 28 discharges into the low pressure area existing in the rear of the automobile body. The existence of such a low pressure area in the rear of an advancing automobile is well known and therefore the duct 28 which discharges into the low area operates in the same way as the ejector 22 and utilizes the travel of the automobile to induce movement of air currents through the automobile body.

Having thus described my invention, it is obvious that various immaterial modifications may be made in the same without departing from the spirit of my invention; hence, I do not wish to be understood as limiting myself to the exact form, construction, arrangement and combination of parts herein described and shown, or uses mentioned.

What I claim as new and desire to secure by Letters Patent is:

An automobile heater comprised of a plurality of longitudinally extending fins integral with and projecting upwardly from the cylinder head of the engine of the vehicle and a box-like cover member adapted to be associated with said fins to provide a plurality of longitudinally extending air passages which communicate with the interior of the vehicle body, said box-like member being open at one side and at one end and having a wall provided at the opposite end, said wall having an aperture adapted to communicate with the interior of the vehicle body, the sides of said box-like member being engageable with certain of said fins to hold said box-like member against displacement relatively to said fins, a top wall of said box-like member being adapted to engage the upper edges of said fins, the open end of said box-like member having the top wall and side walls projected beyond the adjacent ends of said fins.

In testimony whereof, I have hereunto signed my name.

ARTHUR B. MODINE.